Patented Sept. 8, 1942

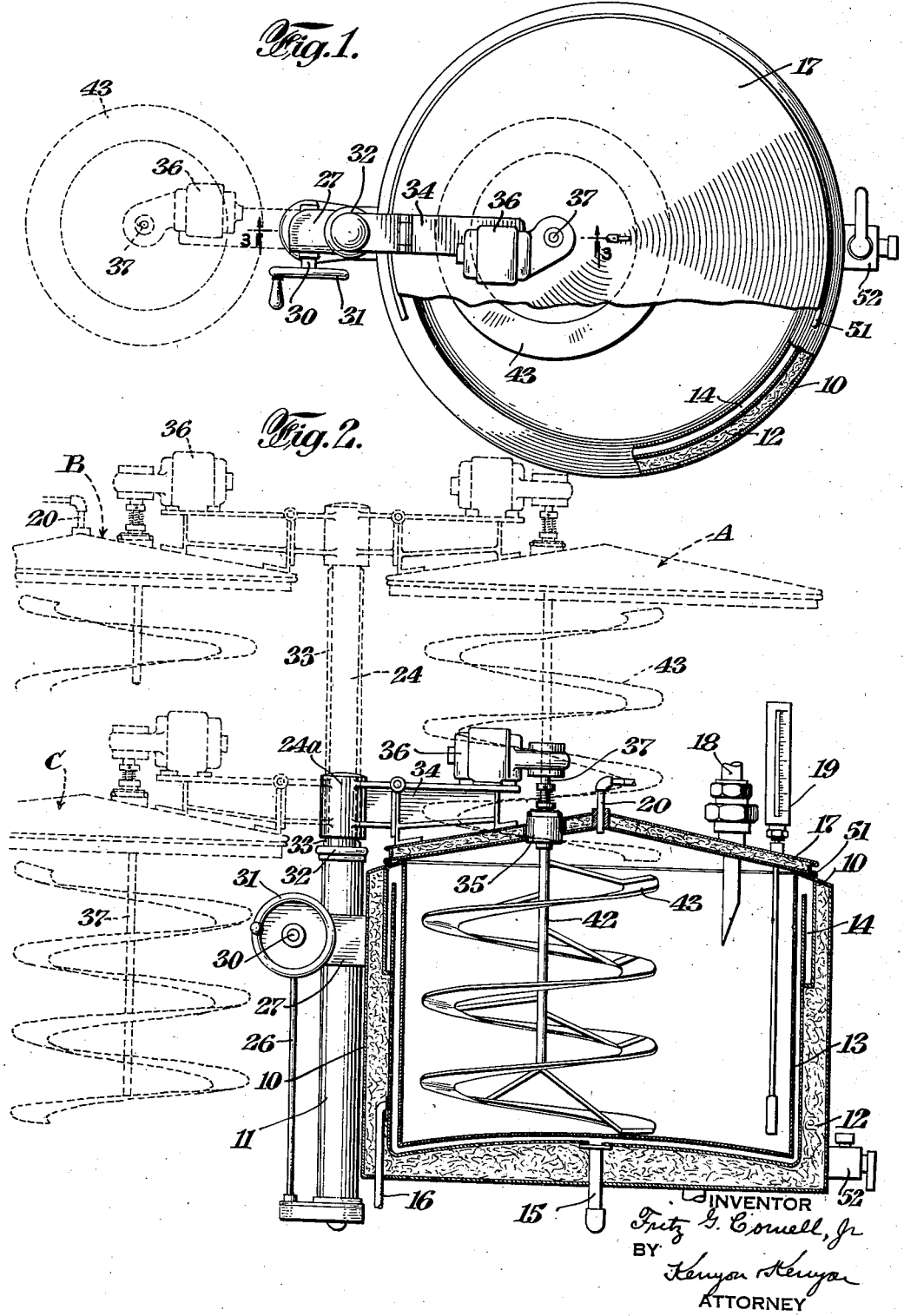

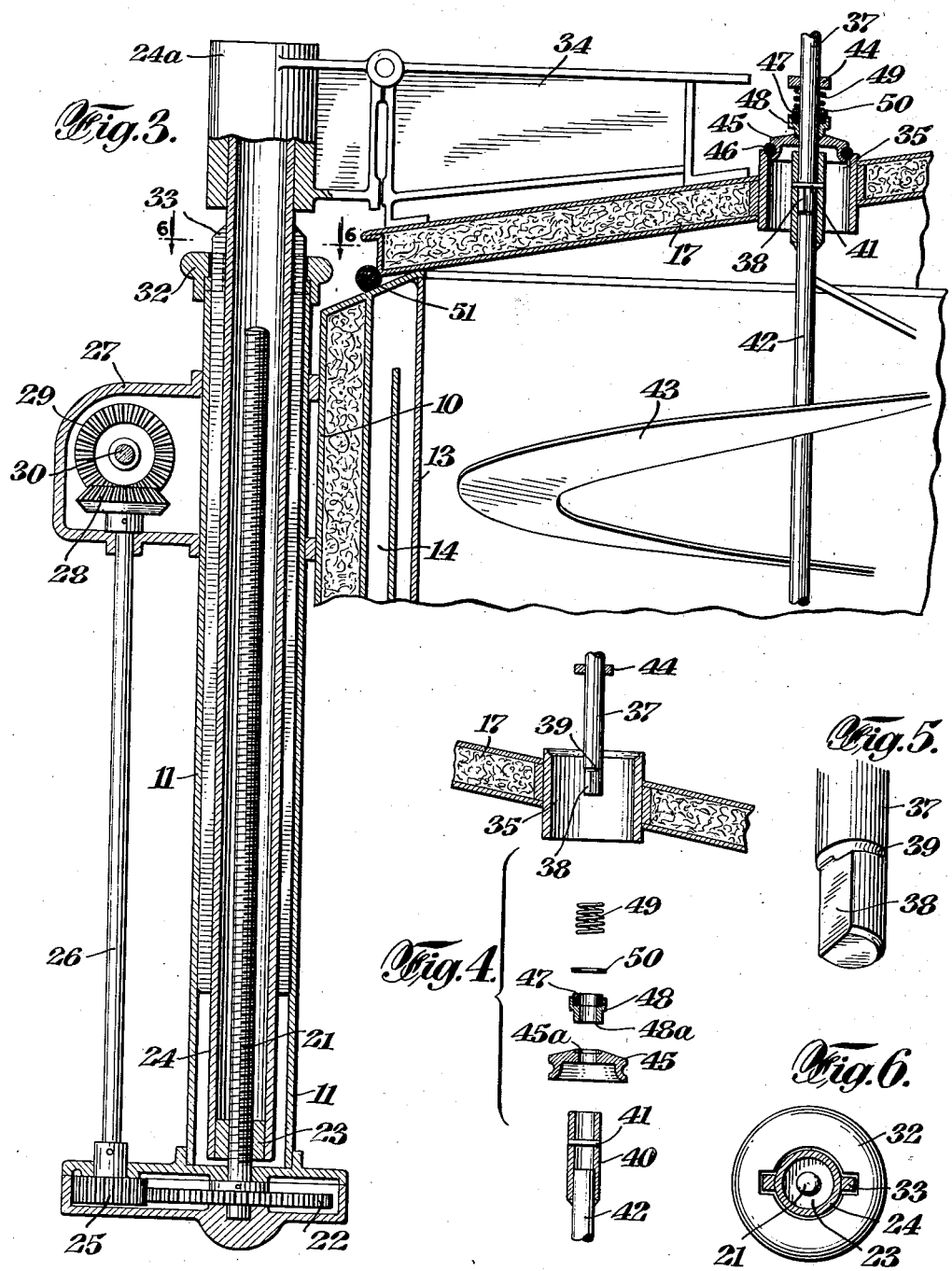

2,295,098

UNITED STATES PATENT OFFICE 2,295,098

SEAL FOR LIQUID TREATING APPARATUS

Fritz G. Cornell, Jr., Mountain Lakes, N. J.

Application November 2, 1939, Serial No. 302,482

9 Claims. (Cl. 286—7)

This invention relates to apparatus for treating liquid dairy products.

Certain methods of treating dairy products, such as milk and cream, require subjection of the dairy product to certain conditions of temperature and vacuum, as well as to agitation. For example, in the deodorization of cream, the odorous volatile constituents together with gas and air trapped in the cream, are removed by subjecting a body of cream to proper conditions of temperature and vacuum and to agitation of such character as to work the air and gas bubbles to the top of the body of cream. Processing of other forms of dairy products also require similar operating conditions.

One form of apparatus for treating dairy products under the above referred to conditions consists of a vat having a jacket through which attempering medium may be circulated to control the temperature of the vat contents. A cover closes the vat with an airtight seal and means are provided for producing a vacuum within the vat. A helical agitator is arranged within the vat and is connected through the cover with driving means which rotate in the proper direction to cause upward flow of the liquid contacted thereby, thus bringing the air and gas bubbles to the surface of the liquid body.

A prime requisite of apparatus for treating dairy products is that it be capable of being easily and quickly and thoroughly cleaned and an object of this invention is the provision of means for effecting removal of the cover and agitator from operating position to a position in which they are readily accessible for cleaning and also the provision of sanitary and cleanable means for detachably connecting the agitator to its driving means.

In an apparatus embodying this invention the vat is equipped with a vertically movable frame to which the cover is attached and which carries a driving shaft which extends through a vacuum-tight seal in the cover and to which the agitator is detachably connected. Means are provided for moving the frame up to a sufficient height for the agitator to clear the top of the vat with the cover and agitator moving directly vertically from their operating positions. After such elevation of the cover and agitator has been effected, the frame is swingable to rotate the cover and agitator to such position that they may be lowered to their original level without contacting the vat and the frame elevating means are operable to lower the frame when in such position. Means are provided to prevent lowering of the frame except with the cover and agitator in the position last referred to or in vertical alignment with their operating position. With the structure above described, cleaning of the vat and agitator is facilitated inasmuch as the cover and agitator may be placed in the most accessible position to the cleaner and when in such position the vat is completely free of any object which might interfere with cleaning it.

Other objects, novel features and advantages of this invention will be apparent from the following specification and accompanying drawings, wherein—

Figure 1 is a plan view of an apparatus embodying the invention;

Fig. 2 is a vertical section through such apparatus;

Fig. 3 is an enlarged fragmentary vertical section on the line 3—3 of Fig. 1;

Fig. 4 is an exploded view of the means by which the agitator is connected to the driving shaft and by which a vacuum-tight seal for the driving shaft is produced;

Fig. 5 is a perspective view of the end of the driving shaft, and

Fig. 6 is a section on the line 6—6 of Fig. 3.

A vat 10 is supported by legs, one of which consists of a tubular housing 11 extending the full height of the vat and being attached to the outer wall thereof in any suitable manner. The vat consists of a double wall insulated housing 12 in which is provided a holder 13 in spaced relation to the inner wall of the housing to form a jacket through which attempering medium may be circulated around the holder. In the upper portion of the housing is formed a channel 14 to which attempering medium is supplied, said channel being open at its top to discharge attempering medium into the space between the holder 13 and housing 12. An outlet pipe 15 is provided for removing attempering medium from the bottom of the housing 12 and an overflow pipe 16 is provided for regulating the maximum depth of attempering medium in the housing. A cover 17 is provided for closing the vat and is provided with an inlet 18 for introducing dairy product into the holder 13, and a thermometer 19 for registering the temperature of the dairy product in the holder. Also the cover is equipped with a pipe 20 leading to a vacuum pump, not shown.

In the housing 11 is rotatably mounted a lead screw 21 having a spur gear 22 fixed to the bottom end thereof. The lead screw 21 passes through a nut 23 fixed to the lower end of a tube 24, the upper end of which projects beyond the upper end of the housing 11. A pinion 25 in mesh with the spur gear 22 is fixed to the vertical shaft 26, the upper end of which extends into a housing 27. A bevel gear 28 in the housing 27 is attached to the shaft 26 and meshes with a second bevel gear 29 keyed to a shaft 30 which extends through the housing 27 and is equipped with a handwheel 31. At the top of the housing 11 is provided a collar 32 having keyways in which are received keys 33 formed on the outer face of the tube 24, such keys terminating at their lower ends above the lower end of the tube 24. Rotation of the handwheel 31 is effective to raise and lower the tube 24 which is held against rotary movement by the keys 33 except when the tube has been elevated sufficiently to locate the lower ends of such keys above the collar 32. At such elevation the tube 24 may be rotated but can be again lowered only after alignment of the keys 33 with the keyways in the collar 32. The arrangement of the keyways and keys is such that the tube 24 may be lowered in either of two positions oriented 180° from each other.

At the upper end of the tube 24 is provided a head 24a to which is hinged an arm 34 in such manner that it normally extends horizontally but may be swung upwardly from horizontal position. The arm is rigidly connected to the cover 17 so that elevation and lowering of the tube 24 lifts the cover out of and returns it to vat-closing position or to a position 180° offset from vat-closing position. A sleeve 35 extends through the cover 17 and is permanently attached thereto. A motor 36 is carried by the arm 34 and has a driving shaft 37 extending downwardly into the sleeve 35. The lower end of the shaft 37 is cut away to provide a flat portion 38 and a groove 39 at the upper end of the flat portion. A tubular coupling member 40 is adapted to fit over the lower end of the shaft 37 and is provided with a crosspin 41 which is so arranged that the coupling member 40 can be slid onto the shaft 37 with the pin 41 lying in the space provided by the flat section 38. When the pin 41 comes into registration with the groove 39, rotation of the coupling member 40 brings the pin into such groove, thereby locking the coupling member to the shaft. The coupling member 40 is permanently attached to a shaft 42 which supports a helical agitator 43 extending substantially to the bottom of the holder 13. This agitator is composed of a flat strip of metal supported from the shaft 42 in the form of a helix.

On the shaft 37 is provided a fixed collar 44 and a cap 45 for the sleeve 35 has a central aperture through which the shaft 37 passes. The exterior diameter of the cap 45 is slightly less than the interior diameter of the sleeve 35 so that it may pass therethrough. The cap is held in the position shown in Figure 3 by a ring 46 of soft, resilient material such, for example, as rubber, which is seated in a groove in the cap and is of sufficient cross section that its exterior diameter exceeds the interior diameter of the sleeve 35. A ring of sealing material 47 is seated in a retaining ring 48, one end of which bears against the cap 45, and a thrust spring 49 is interposed between the collar 44 and a thrust plate 50 resting on the sealing material 47.

In Figures 1, 2 and 3 the apparatus is shown in operating condition. The cover 17 is in closing position and the agitator 43 is connected to the shaft 37 and the sleeve 35 is sealed by the cap 45 and ring 48. A ring 51 of suitable soft, resilient material such, for example, as rubber, is arranged at the junction of the cover and vat to provide a seal to prevent flow of air into the vat. With the apparatus in this condition the dairy product to be treated is introduced through the inlet 18, attemperating medium is circulated around the holder 13 and the desired degree of vacuum is produced through the medium of the vacuum pump which communicates with the interior of the holder through the pipe 20. The agitator 43 is rotated by the motor 36 in such direction as to cause upward flow of air and gas in the liquid in the holder 13, thereby bringing the air and gas to the surface, as well as thoroughly effecting uniform contact of the liquid with the wall of the holder. The volatile constituents of the dairy product are released by the treatment and are removed through the pipe 20. After the completion of the treatment, drainage of the holder is effected through the pipe 52.

In order to clean the apparatus and recondition it for further use, the handwheel 31 is operated to lift the member 24, together with the cover 17 and agitator 43, to the position indicated at A in dotted lines in Fig. 2, in which position the keys 33 have moved completely out of the keyways in the collar 32. Next the cover and agitator are swung to the position indicated at B in dotted lines, such position being 180° removed from position A and again bringing the keys 33 into alignment with the keyways but in opposite registration. Cover and agitator are now lowered to the position shown at C in dotted lines by reverse operation of the handwheel 31. The cover and agitator are now easily accessible for cleaning and for disconnecting the agitator from the shaft 37 for the purpose of cleaning the seal for the sleeve 35. Reversal of the procedure just described brings the cover and agitator back into operating position relative to the vat 10.

With the cover and agitator in the position indicated at C in Fig. 2, the agitator may be disconnected from the drive shaft 37 merely by proper direction of rotation of the agitator relative to the shaft to bring the pin 41 into register with the flat portion 38 of the shaft followed by downward pull on the agitator. Also in this position of the cover, the seal for the shaft 37 may be taken apart for cleaning. In taking apart this seal the ring 46 is pried out of the peripheral groove by the use of any suitable tool and by concurrent upward movement of the cap 45 against the action of the spring 49. Thereupon the cap 45 may be pulled downwardly over the shaft 37 through the sleeve 35 and the other parts may be likewise removed. The relationship of such parts for removal purposes is illustrated in Fig. 4. As is best evident in Fig. 4 the ring 48 and the cap 45 are provided with coating surfaces 48a and 45a respectively which form a lapped joint which is vacuum tight. The cap 45 at all times remains stationary while the ring 48, together with the sealing material 47, retaining ring 48, thrust spring 49 and thrust plate 50, rotate with the shaft 37. The hinged connection between the arm 34 and the head 24a insures uniform contact of the cover with the edge of the vat in the event that the operator pulls down the tube 24 too far. Without such connection there might be a tendency for the cover to tip upward at an angle under such condition. Also, while the arrangement of keys and keyways on the tube 24 and in the cover 32 have been shown in such relation that the two positions of the cover are 180° apart, it is to be understood that this invention contemplates any arrangement of keys and keyways which will insure that the cover and agitator are completely clear of the vat when in the position indicated in dotted lines at C in Fig. 2. It is also to be understood that various modifications may be made in the apparatus above described, without in any way departing from the spirit of the invention as defined in the appended claims.

I claim:

1. In combination with a closed dairy product treating vat having provision for producing sub-atmospheric pressure therein and equipped with an opening through which a shaft extends, sanitarily constructed and removable vacuum-tight sealing mechanism comprising a cap for said opening of less diameter than said opening surrounding said shaft and capable of removal through said opening and having a peripheral groove, a sealing member seated in said groove in contacting relation to the edge of said opening and of greater overall dimensions than the interior dimensions of said opening, a ring sealed to said shaft, said ring and cap having contacting smooth surfaces, and pressure-maintaining means urging said ring into contact with said cap to form a vacuum-tight seal between said surfaces.

2. In combination with a closed dairy product treating vat having provision for producing sub-atmospheric pressure therein and equipped with an opening through which a shaft extends, sanitarily constructed and removable vacuum-tight sealing mechanism comprising a cap for said opening of less diameter than said opening surrounding said shaft and capable of removal through said opening, a sealing member in contacting relation with said cap and the edge of said opening and of greater overall dimensions than the interior dimensions of said opening, a ring sealed to said shaft, said ring and cap having smooth surfaces forming a vacuum-tight seal, an abutment on said shaft, and a spring interposed between said abutment and ring for urging the latter against said cap.

3. In combination with a closed dairy product treating vat having provision for producing sub-atmospheric pressure therein and equipped with an opening through which a shaft extends, sanitarily constructed and removable vacuum-tight sealing mechanism comprising a cap for said opening of less diameter than said opening surrounding said shaft and capable of removal through said opening, a sealing member in contacting relation with said cap and the edge of said opening and of greater overall dimensions than the interior dimensions of said opening, and a ring sealed to said shaft, said ring and cap having contacting surfaces forming a vacuum-tight seal.

4. In combination with a closed dairy product treating vat having provision for producing sub-atmospheric pressure therein and equipped with an opening through which a shaft extends, sanitarily constructed and removable vacuum-tight sealing mechanism comprising a cap for said opening of less diameter than said opening surrounding said shaft and capable of removal through said opening, a sealing member in contacting relation with said cap and the edge of said opening and of greater overall dimensions than the interior dimensions of said opening, a ring sealed to said shaft, said ring and cap having contacting smooth surfaces forming a vacuum-tight seal, and means urging said ring against said cap.

5. In combination with a closed dairy product treating vat having provision for producing sub-atmospheric pressure therein and equipped with an opening through which a shaft extends, sanitarily constructed and removable vacuum-tight sealing mechanism comprising a non-rotatable member of less area than but of corresponding configuration with said opening to be capable of removal therethrough and having a bore receiving said shaft, a sealing element in contact with the edge of said opening and the edge of said member and of greater overall dimensions than the interior dimensions of said opening, a second member having a vacuum-tight connection with said shaft and rotatable therewith, said two members being composed of non-absorbent material and having smooth contacting surfaces, and means urging said two members toward each other.

6. In combination with a closed dairy product treating vat having provision for producing sub-atmospheric pressure therein and equipped with an opening through which a shaft extends, sanitarily constructed and removable vacuum-tight sealing mechanism comprising a non-rotatable metal member of less area than but of corresponding configuration with said opening to be capable of removal therethrough and having a bore receiving said shaft, a sealing ring in contact with the edge of said opening and the edge of said member and of greater overall dimensions than the interior dimensions of said opening, a metal member having a vacuum-tight connection with said shaft and rotatable therewith, said two members having smooth contacting surfaces, and means urging said two members toward each other.

7. In combination with a closed dairy product treating vat having provision for producing sub-atmospheric pressure therein and equipped with an opening through which a shaft extends, sanitarily constructed and removable vacuum-tight sealing mechanism comprising a non-rotatable member of less area than but of corresponding configuration with said opening to be capable of removal therethrough and having a bore receiving said shaft, a sealing element in contact with the edge of said opening and the edge of said member and of greater overall dimensions than the interior dimensions of said opening, a second member having a vacuum-tight connection with said shaft and rotatable therewith, said two members being composed of non-absorbent material and having smooth contacting surfaces, and means for maintaining said two members in vacuum-tight relationship.

8. In combination with a closed dairy product treating vat having provision for producing sub-atmospheric pressure therein and equipped with an opening through which a shaft extends, sanitarily constructed and removable vacuum-tight sealing mechanism comprising a non-rotatable metal member of less area than but of corresponding configuration with said opening to be capable of removal therethrough and having a bore receiving said shaft, a sealing element in contact with the edge of said opening and the edge of said member and of greater overall dimensions than the interior dimensions of said opening, a metal member having a vacuum-tight connection with said shaft and rotatable therewith, said two members having smooth contacting surfaces, and means for maintaining said two members in vacuum-tight relationship.

9. In combination with a closed dairy product treating vat having provision for maintaining a predetermined degree of vacuum therein for treatment of a dairy product contained in the vat and equipped with an opening through which a shaft extends, sanitarily constructed and removable vacuum-tight sealing mechanism comprising means closing the outer end of said opening and including a non-rotatable member of non-absorbent material of corresponding configuration with but of less area than said opening to be capable of removal therethrough and having an aperture through which said shaft passes, a sealing element in contact with the edge of said opening and the edge of said member and of greater overall dimensions than the interior dimensions of said opening, a second member of non-absorbent material sealed to said shaft, said two members having contacting smooth surfaces, and means urging said two members toward each other to maintain vacuum-tight relationship between said contacting surfaces.

FRITZ G. CORNELL, Jr.